July 16, 1940.  J. J. CROWE  2,208,211
VARIABLE-SPEED TORCH CARRIAGE
Filed Oct. 24, 1939
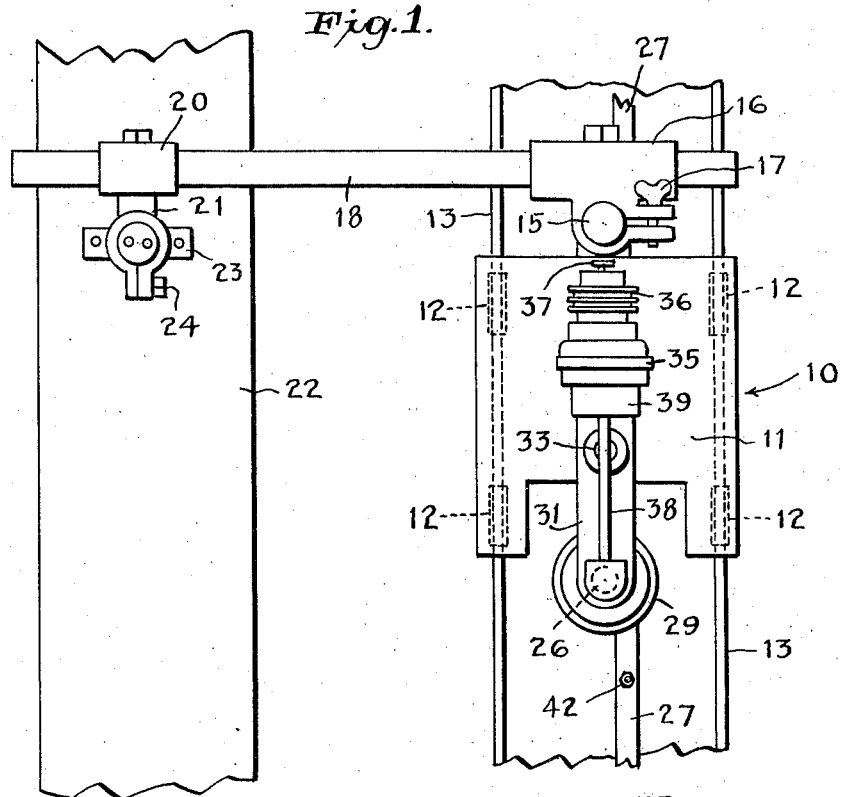
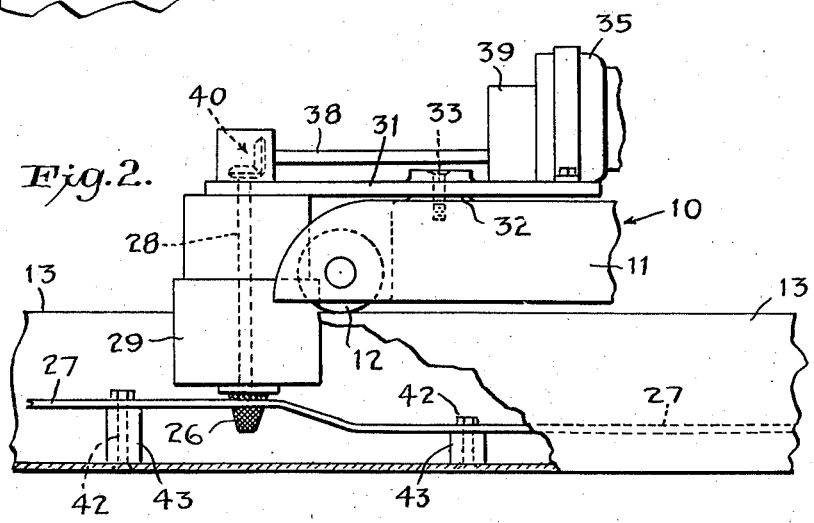

Patented July 16, 1940

2,208,211

UNITED STATES PATENT OFFICE 2,208,211

VARIABLE-SPEED TORCH CARRIAGE

John J. Crowe, Westfield, N. J., assignor to Air Reduction Company, Incorporated, New York, N. Y., a corporation of New York Application October 24, 1939, Serial No. 300,994

10 Claims. (Cl. 266—23)

This invention relates to torch carriages such as are used for moving gas torches across the surface of a piece of work at a controlled speed.

Such torch carriages are used for a variety of operations, such as gas cutting, scale removal, and flame hardening. In all of these operations the rate of travel of the torch is important. It is usual to provide motor-driven torch carriages with governors that maintain the speed substantially uniform but are adjustable to obtain faster or slower speeds.

With gas cutting the torch must not be advanced too fast or the cut will be lost, while a speed slower than necessary is objectionable because it makes a wider kerf and wastes both time and gas. With the same cutting jet, thin sections can be cut faster than thick ones, and when there is much variation in the thickness along the length of a cut it is advantageous to move the torch at different rates of speed at the regions of different thickness.

For scale removal with the gas heating torch, the speed must be slow enough to accomplish the purpose, but any further reduction in speed makes the gas consumption higher than necessary. In flame hardening operations, the rate of movement of the torch controls the depth of hardening. Heat flows away from the region under the torch by conduction through the metal, and the heat losses depend upon the mass of metal close to the region of heating. With workpieces of varying section, and toward the end of any work-piece, variation in torch speed may be essential for uniform hardening results.

It is an object of this invention to change automatically the rate of movement of a torch carriage at predetermined points along its path of travel. These points are chosen to correspond with positions of the torch near the end or near a change in section of the work-piece or where it is desired to change the depth of hardening.

A more specific object of the invention is to drive a self-propelled torch carriage at variable speed by means of a tapered face, magnetic, traction roller that contacts with a template which is of different height at different regions along its length.

The preferred embodiment of the invention employs a magnetic roller driven by an electric motor. Other kinds of friction rollers can be employed. A spring driven, gas driven, or various other motors can be used to propel the carriage.

Other objects, features, and advantages of the invention will appear or be pointed out as the specification proceeds.

In the accompanying drawing, forming a part hereof:

Fig. 1 is a diagrammatic top plan view of a variable-speed torch carriage embodying this invention.

Fig. 2 is an enlarged, fragmentary, side elevation showing the driving mechanism of the carriage illustrated in Fig. 1.

A torch carriage 10 has a box frame 11 and is rotatably supported by wheels 12 that run on a track 13. In the drawing the track 13 is a channel beam but other tracks can be employed.

A post 15 extends upward from the rearward end of the frame 11 and supports a bracket 16 that is clamped to the post 15 by a clamping screw 17. A bar 18 that extends horizontally through the bracket 16 is clamped by the bracket and carries a torch-supporting bracket 20 that can be clamped at any position along the bar 18. A torch-holder 21 is held by the bracket 20 spaced from the side of the carriage and over the work, which comprises a metal body 22.

The torch-holder 21 has a split clamp portion that is clamped against the stock of a torch 23 by a screw 24. This screw is released to permit the torch to be moved toward or from the work 22 to adjust the spacing of the torch 23 from the surface on which it is operating. Other known torch adjusting apparatus may be employed.

The carriage 10 is propelled by a magnetic roller 26 that adheres to and travels along a template 27 located between the rails of the track 13. The roller 26 is secured to the end of a drive shaft 28 and is magnetized by an electro-magnet 29 that surrounds the drive shaft 28.

The magnet 29 and drive shaft 28 are connected to a swivel platform 31 that rests upon a bearing 32 on the carriage. The platform 31 is fastened to the carriage by a swivel connection 33 that restricts movement of the platform to angular movement in a horizontal plane about the axis of the swivel connection.

An electric motor 35 is mounted on the platform 31 on the opposite side of the swivel connection from the magnet 29 so as to counterbalance at least a part of the weight of the magnet and drive shaft. The motor 35 operates at a uniform speed under the control of a centrifugal governor 36 which can be adjusted by a knob 37 to hold the motor to any desired speed over a considerable range. Such motors and governors are well known in the torch cutting machine art, and a detailed description is included in Patent No. 2,032,743, dated March 3, 1936.

The motor 35 drives a shaft 38 through reduction gearing 39. Bevel gears 40 transmit rotation of the shaft 38 to the roller drive shaft 28.

The roller 26 is the traction roller of the carriage and is preferably knurled to increase its friction with the template 27. The roller 26 has a tapered peripheral surface considerably wider than the face of the template with which it contacts. The lineal speed of travel of the roller 26 along the template 27 depends upon the diameter of that portion of the roller that is in contact with the template.

The template 27 is attached to the bottom of the channel between the rails of the track 13 by bolts 42. Spacers 43 hold the template spaced from the bottom of the channel and the template is designed so that it changes in height, and contacts with a portion of the roller 26 of different diameter, at regions where a change of speed is desired. This roller-template combination makes the speed variation entirely automatic at any selected point along the course of movement of the carriage.

Terms of orientation are, of course, relative, and the invention is not limited to the embodiment illustrated. The template position is, of course, optional and may be above the carriage or along either side of the track instead of between the rails, the roller-support being reversed or extended according to the location of the template.

I claim:

1. A torch carriage including a torch-supporting frame, means stably supporting the frame for movement along a desired course, power-operated mechanism for moving the frame along said course, and automatic speed-control means for changing the rate of movement of the torch carriage at a predetermined time in its travel along said course.

2. In a torch carriage that travels along supporting means to shift a torch across the surface of a work-piece at a definite speed which is different at different parts of the work-piece, the combination with said torch carriage of driving mechanism including a constant-speed motor and a traction roller with a tapered peripheral surface, different parts of which contact with a fixed friction surface to drive the carriage at different speeds.

3. A movable torch carriage and driving means for said carriage including a motor, a traction roller which has a tapered friction surface, motion transmitting connections between the motor and roller, and electromagnetic means for magnetizing the tapered roller to increase its friction with a template.

4. Apparatus for moving a torch across the surface of a work-piece including in combination a carriage, means stably supporting the carriage for movement along a course, a torch-supporting arm connected with the carriage and extending beyond the side of the carriage in a direction transverse of the direction of movement of the carriage, a torch-holder adjustable along the arm toward and from the side of the carriage, means on the torch-holder for adjusting a torch toward or from the surface of the work-piece, and mechanism for driving the carriage at a variable speed including a constant speed motor, a traction roller with a tapered peripheral surface, a template shaped to contact with different-diameter portions of the roller at different regions along the length of said template, and electromagnetic means for magnetizing the roller to increase its friction with the template.

5. Apparatus for moving a torch across the surface of a work-piece including in combination a torch carriage with idler wheels by which said carriage is stably supported, a track on which the carriage runs, and a traction roller with a tapered traction surface, different portions of which contact with a friction surface to move the carriage at different speeds along the track.

6. A torch carriage including a frame, wheels supporting the frame for movement along a track, a driving roller having a tapered friction surface for moving the carriage at different rates of speed dependent upon the diameter of the portion of the roller that contacts with a stationary surface with which the roller contacts, and means connecting the driving roller with the frame including relatively movable parts of such a nature that the roller axis can shift transversely along one course independently of the frame.

7. A variable-speed torch carriage including a frame, idler wheels under said frame and supporting it for movement along a track, a traction roller supported for rotation about a vertical axis and having a tapered friction surface for propelling the carriage at different speeds by contact of different-diameter portions of the roller with a template, a platform, a swivel connection between the platform and the frame, said platform being angularly movable on the swivel connection about a vertical axis, means supporting the traction roller from said platform at a point ahead of the swivel connection, and a motor mounted on the platform on the side of the swivel connection remote from the traction roller.

8. The combination with a movable torch carriage, of power driving mechanism including a motor, and means located along the path of movement of the torch carriage effective to change the rate of travel of said carriage.

9. Apparatus for moving a torch across a work-piece at non-uniform speed, said apparatus comprising a self-propelled, wheeled carriage, a torch support on the carriage, a track on which the carriage runs, and a device located along the length of the track and adapted to cause a change in the speed of the carriage when said carriage reaches a predetermined point along the track.

10. A torch carriage including a frame stably supported by idler wheels for movement along a two-rail track, a power-driven magnetic roller supported by the carriage frame for rotation about a vertical axis, said magnetic roller having a tapered peripheral surface and being located between the rails of the track, and a template extending lengthwise of the track between the rails in position to contact with the magnetic roller, said template having a face narrower than the height of the tapered surface of the roller, and being of variable height along its length so that sections of different diameter of the roller contact with the template at different regions along the length of said template.

JOHN J. CROWE.

DISCLAIMER 2,208,211.—*John J. Crowe*, Westfield, N. J. VARIABLE-SPEED TORCH CARRIAGE. Patent dated July 16, 1940. Disclaimer filed April 16, 1943, by the assignee, *Air Reduction Company, Incorporated*.

Hereby enters this disclaimer to claims 1, 8, and 9 of said patent.

[*Official Gazette May 18, 1943.*]